US006981330B2

(12) United States Patent
Tieszen

(10) Patent No.: US 6,981,330 B2
(45) Date of Patent: Jan. 3, 2006

(54) MULTI-AXIS INSTALLABLE AND ADJUSTABLE LEVEL

(76) Inventor: Dwayne A. Tieszen, P.O. Box 428, Ponder, TX (US) 76259

(*) Notice: Subject to any disclaimer, the term of this patent is extended or adjusted under 35 U.S.C. 154(b) by 1 day.

(21) Appl. No.: 10/807,448

(22) Filed: Mar. 24, 2004

(65) Prior Publication Data

US 2005/0210692 A1 Sep. 29, 2005

(51) Int. Cl.
*G01C 9/28* (2006.01)

(52) U.S. Cl. ............................ 33/370; 33/374; 33/379; 33/386

(58) Field of Classification Search .......... 33/370–371, 33/365, 379, 374–377, 382–386, 390, 366.11, 33/465, 471, 469, 495–500
See application file for complete search history.

(56) References Cited

U.S. PATENT DOCUMENTS 312,266 A * 2/1885 Gurley ........................ 33/373
2,624,118 A * 1/1953 Anderson .................... 33/372
2,752,692 A * 7/1956 Smith .......................... 33/374
2,831,264 A * 4/1958 Weaver ....................... 33/337
3,820,249 A * 6/1974 Stone .......................... 33/347
3,916,531 A * 11/1975 Morton ........................ 33/333
4,506,408 A * 3/1985 Brown ......................... 16/225
4,542,592 A * 9/1985 Hopkins ...................... 33/386
4,739,561 A * 4/1988 Mills ........................... 33/370
4,785,544 A * 11/1988 Heinsius et al. .............. 33/334
4,829,676 A 5/1989 Waldron
5,025,568 A * 6/1991 Grimes ........................ 33/371
5,123,768 A * 6/1992 Franklin ...................... 403/96
5,163,229 A 11/1992 Cantone
5,174,034 A 12/1992 Swanda
5,402,579 A 4/1995 Smith
5,406,713 A 4/1995 Oman et al.
5,421,094 A 6/1995 McCord et al.
5,628,521 A 5/1997 Schneider et al.
5,685,083 A * 11/1997 Decesare ..................... 33/390
5,806,196 A * 9/1998 Gibbs et al. .................. 33/333
5,839,200 A 11/1998 Decesare
5,933,919 A * 8/1999 Miller et al. .................. 16/244
6,131,298 A 10/2000 McKinney et al.

(Continued)

FOREIGN PATENT DOCUMENTS

JP 7-292865 11/1995

*Primary Examiner*—G. Bradley Bennett
*Assistant Examiner*—Yaritza Guadalupe
(74) *Attorney, Agent, or Firm*—Richard C. Litman

(57) ABSTRACT

The present multi-axis installable and adjustable level is permanently installed to a suitable panel on or in a movable structure, such as a recreational vehicle or the like, or a portable work table or the like. The present level enables a user of the structure to level the structure precisely as required, and/or to determine the level of the structure, once the present level has been properly installed. The present level comprises a pair of leaves or panels which are hinged together, with one of the leaves providing coarsely adjustable permanent attachment to the structure and the opposite leaf including a bull's eye type level thereon. The first leaf is secured to a suitable panel (which may be sloped, horizontal, or vertical) of the structure, and the second leaf is extended and locked in a substantially horizontal orientation. The bubble level is then leveled precisely using the infinitesimal adjustment provided.

16 Claims, 9 Drawing Sheets

U.S. PATENT DOCUMENTS

| | | | | |
|---|---|---|---|---|
| 6,332,277 | B1 | 12/2001 | Owoc et al. | |
| 6,338,203 | B1 * | 1/2002 | Strickland | 33/645 |
| 2001/0025426 | A1 | 10/2001 | Fischer | |
| 2002/0174553 | A1 | 11/2002 | Dolezal et al. | |
| 2003/0066198 | A1 * | 4/2003 | Turner | 33/370 |
| 2003/0093909 | A1 | 5/2003 | Liao | |

* cited by examiner

MULTI-AXIS INSTALLABLE AND ADJUSTABLE LEVEL

BACKGROUND OF THE INVENTION

1. Field of the Invention

The present invention relates generally to indicating devices for displaying a level line or plane, and more specifically to a leveling device which is permanently installed and adjusted on or in a movable structure, whereupon the structure may be accurately leveled by means of the present leveling device. The present level includes a two way adjustable base and an infinitesimally adjustable "bull's eye" type bubble level vial, whereby the device may be finely adjusted after installation to provide a level reference whenever the structure to which it is secured is moved.

2. Description of the Related Art

There are innumerable portable structures which require at least a close approximation of a level attitude when they are relocated periodically. Examples of such are motor homes, house trailers, and camper type vehicles. Oftentimes, a craftsman must erect a work table or the like, which requires a level attitude for accurate work. The conventional technique nearly universally used for leveling such structures is to place a level (e.g., linear or bull's eye level, electronic leveling device, etc.) temporarily on or across a surface of the structure desired to be leveled, adjust the structure until it is level according to the level instrument, and remove the instrument from the structure.

The problem with this technique is that the portable level must be repositioned on or in the structure, each time it is necessary to level the structure. In those cases where a linear level is used, the level must be repositioned at least once, normal to its initial alignment, in order to establish a level orientation for the structure. Usually, such a linear level must be repositioned back and forth a number of times along the two axes being leveled, as the adjustment along one axis will throw off a previous adjustment along the other normal axis. While such fine adjustment may not be necessary for leveling a recreational vehicle for a relatively short period of time, it may be critical for a work table or the like, where extreme precision is required.

In some instances, people have secured conventional level instruments to the structure in order to avoid the need to position and reposition a level or levels temporarily on the structure, each time it must be leveled. However, conventional levels have no adjustability built into them, as their bases are immovably fixed relative to the level indicator (bubble, etc.) display. This results in a great deal of difficulty in accurately positioning such a conventional level in a permanent attachment. While such levels can be shimmed and otherwise adjusted before being permanently secured in place, the very act of securing them (e.g., driving screws, applying adhesives, etc.) is often sufficient to induce some slight variance between true level and the level indicator. The user of the structure must thereafter always compensate for the error induced.

The present invention provides a solution to the above problem, by means of a level instrument which is configured for permanent attachment to a movable or portable structure, and which provides for multiple axis adjustment to fine tune the device after installation. This assures that once the structure has been leveled, that the present level indicator can also be precisely leveled along or across multiple axes, with the present level device always providing a true indication of level (or deviation therefrom) for the structure to which it has been permanently secured.

A discussion of the related art of which the present inventor is aware, and its differences and distinctions from the present invention, is provided below.

U.S. Pat. No. 4,829,676 issued on May 16, 1989 to David C. Waldron, titled "Hands-Free Level Indicating Device," describes a conventional linear bubble or spirit level which has been modified with a slot at each end thereof, with a generally U-shaped clamp being placed in each slot. This configuration allows the level to be temporarily clamped to a wide number of different elongate objects (pipes, joists, etc.). Waldron does not provide any means of permanently attaching the level to a structure to be leveled, nor does the level include any means for adjusting its attitude after installation or attachment to another article or object. Moreover, the Waldron level cannot be used to provide an omnidirectional display of the level of a surface, as can the bull's eye level used with the present multiple axis installable and adjustable level.

U.S. Pat. No. 5,163,229 issued on Nov. 17, 1992 to Giovanni F. Cantone, titled "Plumb And Horizontal Locating Device," describes a pendulum type leveling instrument having a light beam therein to project a vertical or horizontal beam of light, depending upon the embodiment. Cantone does not disclose any means of permanently attaching his level to another object or structure, nor for adjusting the level of the base relative to the structure upon which it is place or attached. Moreover, the configuration of the Cantone level would require that the plumb bob be removed whenever the structure is moved. Precise replacement of the plumb bob would not be possible, due to minor variations in position while placing the plumb bob on its two mutually normal support rods.

U.S. Pat. No. 5,174,034 issued on Dec. 29, 1992 to Richard L. Swanda, titled "All-Purpose Level," describes a level which extends normal to a pair of hinge leaves. The device is adapted for use in determining the verticality of corners and the like, wherein the two leaves are extended along each side of the corner and the level is read to determine if the leaves, and therefore the sides which define the corner, are perpendicular. While the Swanda device uses hinge leaves, the leaves have no holes therethrough to permit the permanent attachment of the device to a structure; it must be held in place. Moreover, Swanda does not provide any form of adjustment for his level. In the event that it were to be attached to a non-vertical surface (or non-horizontal, in some embodiments), the level could not be adjusted to indicate level for the remainder of the structure.

U.S. Pat. No. 5,402,579 issued on Apr. 4, 1995 to Robert K. Smith, titled "C-Clamps With Integral Bubble Levels," describes a linear bubble type level permanently and immovably affixed to the back or spine of the C-clamp; no adjustment is possible. The Smith level and C-clamp combination can only be temporarily secured to a relatively thin and substantially vertical panel, to check the verticality of the panel. Smith provides no means for permanently securing a level to one side or surface of a panel, or for adjusting the level indicator after installation to match it to a true horizontal reference, which features are parts of the present invention. Moreover, the Smith device cannot utilize a bull's eye type level, as the leveling of the C-clamp about its clamping axis is arbitrary.

U.S. Pat. No. 5,406,713 issued on Apr. 18, 1995 to Robert Oman et al., titled "Apparatus For Maintaining A Scientific And Measuring Instrument Or The Like In A Level Plane," describes a tripod with a central column normal to the plane of the legs. A pendulum type device is disposed within the column, and determines the verticality of the column (and hence the horizontal attitude of the legs) by contact with contacts disposed upon the inner walls of the column when the column is not vertical. Contact results in the operation of one or more motors at the feet of the device in order to level the device automatically. The Oman device cannot be permanently installed upon a surface that is other than very close to horizontal, and no adjustment for the level means relative to the remainder of the tripod structure is provided. No visual level indication is provided.

U.S. Pat. No. 5,421,094 issued on Jun. 6, 1995 to David W. McCord, titled "Adjustable Level," describes an angle having a bull's eye type level secured to a plane normal to both arms of the angle. The device is primarily adapted for temporary placement along a pipe or column, to check the verticality of the pipe; no permanent attachment means is provided. While the plate upon which the bubble level is mounted can be turned to allow the device to check angles other than vertical, the bubble level adjustment is only in a single plane, and only for a relative few angles. McCord does not provide infinitesimal adjustment of his bubble level in two mutually perpendicular dimensions relative to the body of his device, whereas such infinitesimal, bidimensional adjustment is a part of the present invention.

U.S. Pat. No. 5,628,521 issued on May 13, 1997 to Robert H. Schneider et al., titled "Manually Operated Vehicle Leveling System," describes the installation of a series of hydraulic jacks in a recreational vehicle or the like. Schneider et al. recognize the desirability of leveling such vehicles when parked and used as living quarters, but only disclose the actual physical leveling system. The only means of measuring or checking the level of the vehicle mentioned by Schneider et al., is the use of a conventional, temporarily placed, portable bubble level (column 6, lines 10 and 11). Schneider et al. do not disclose any form of permanently mounted level indicator which is adjustable to match the level indicator with the true level of the structure after installation, as provided by the present invention.

U.S. Pat. No. 5,839,200 issued on Nov. 24, 1998 to Dominic Decesare, titled "Multi-Function Horizontal And Vertical Alignment Tool," describes a temporarily installable (no permanent mounting means are provided) bull's eye level, wherein the level is mounted upon an arcuately adjustable bracket secured to the elongate level body. The adjustment is only in a single plane, rather than being bi-directional, as in the case of the present level device. Moreover, Decesare provides only five different positions for his level adjustments relative to the level body. In contrast, the present level device is infinitesimally adjustable in any direction(s) defining a leveling plane, and in addition includes coarser initial adjustments which may be performed during the installation to permit the device to be permanently secured to virtually any surface, regardless of its angle or slope.

U.S. Pat. No. 6,131,298 issued on Oct. 17, 2000 to William McKinney et al., titled "Self-Supporting Level Measurement Device," describes an otherwise conventional multi-tube bubble level having a spring clamp removably secured to each end thereof. The clamps are used to temporarily secure the level to another structure, e.g., a framing stud, etc., to check the verticality thereof during construction. The clamps secure to the level body by means of square retaining studs in the manner used to secure a socket to the drive of a ratchet wrench. No means for permanently mounting the device to a surface, or for precisely adjusting the level vials relative to the body of the device after such installation, are disclosed by McKinney et al.

U.S. Pat. No. 6,332,277 issued on Dec. 25, 2001 to Greg J. Owoc et al., titled "Level With Securing Apparatus," describes an otherwise conventional level with a number of embodiments of devices for securing the level temporarily to another structure (framing stud, pipe, etc.). The various temporary securing means comprise clamps, straps, surrounding bands, etc. None of the securing means provides for the permanent attachment of the device to a generally planar surface, as does the present level indicator invention. Owoc et al. do not provide any means of adjusting the angles of the level vials within the conventional level body of their device. The Owoc et al. level is felt to resemble the level of the '298 U.S. Patent to McKinney et al. more closely than it does the present invention.

U.S. Pat. Publication No. 2001/25,426 published on Oct. 4, 2001, titled "Leveling Instrument-Clamping Device," describes a specialized attachment mechanism for temporarily securing a surveyor's precision level to the top of a tripod. As such, the mechanism cannot be permanently secured to a generally planar surface, as provided by the present invention. Moreover, the level device disclosed in the 426 publication is not a component of the mechanism for which a patent is sought. Rather, the level adjustment mechanism merely provides an interface between an existing, conventional surveyor's level or the like, and the conventional tripod to which such levels are conventionally mounted for temporary use in the field.

U.S. Pat. Publication No. 2002/174,553 published on Nov. 28, 2002, titled "Adjustable Level," describes a three way tubular bubble level permanently and immovably attached to a pipe clamp type mechanism. The level body cannot be adjusted relative to the clamp mechanism, and no means is provided for permanently attaching the device to a generally planar structure, as provided by the present level.

U.S. Pat. Publication No. 2003/93,909 published on May 22, 2003, titled "Level Having A Detachable And Quick Release Structure," describes an insert for removable installation in a conventional level frame, for holding a small line level in the level frame. No means for permanently mounting the level to another surface, or for adjusting the level relative to the level frame, are provided.

Finally, Japanese Patent Publication No. 7-292,865 published on Nov. 7, 1995, titled "Base Piece With Circular Level," describes (according to the drawings and English abstract) a bracket for permanently imbedding within a concrete slab or the like. The bracket includes a U-shaped upper portion, to which a bull's eye level may be secured. No means for mechanically fastening the device to a generally planar panel, or for bidirectionally adjusting the level of the bubble level, is apparent.

None of the above inventions and patents, taken either singly or in combination, is seen to describe the instant invention as claimed. Thus a multi-axis installable and adjustable level solving the aforementioned problems is desired.

SUMMARY OF THE INVENTION

The present multi-axis installable and adjustable level provides an easily installed and inexpensive device for precisely leveling a structure periodically. Recreational vehicles and other mobile vehicles generally include some means of adjusting the chassis to provide a level orientation to compensate for any slope of the underlying terrain for the comfort of persons living therein. The present level device is particularly well-suited for permanent installation in such vehicles used as temporary living quarters from time to time. It is also useful for leveling work tables and the like when installed thereon.

The present level includes a pair of leaves or shells which are pivotally secured together by hinges along a common edge. One of the leaves includes a series of fastener holes, enabling the device to be permanently secured to any suitable, generally planar surface. Coarse adjustment is provided by means of slots for the fastener holes. The other leaf includes a circular, bull's eye type level therein. Coarse adjustment between the two leaves is provided by a series of mating, radially disposed teeth formed in the mating faces of the hinge lugs. Once the hinge bolt is tightened, the leaves are locked together due to the engagement of the mating teeth. The structure is initially leveled using conventional measurement procedures. The present level device is then permanently installed upon any suitable surface, with the coarse adjustments noted above being made to provide an approximate indication of level for the bull's eye level.

The bull's eye level includes fine adjustment means securing it to its underlying leaf, with the fine adjustment means providing infinitesimal adjustment of the bull's eye level relative to its leaf. This enables the bull's eye level to be adjusted precisely to match the previously leveled structure. Once the present level has been adjusted, no further adjustment, maintenance, or other work is required to use the device. Whenever the structure must be leveled, the user need only consult the previously installed and adjusted level of the present invention and adjust the level of the structure accordingly in order to precisely level the structure. Other embodiments provide for the folding of the two leaves, and means for precisely opening and aligning the folded leaf to its proper position.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a multi-axis installable and adjustable level for permanent installation in or on a portable or movable structure (e.g., a recreational vehicle, camper, work table, etc.) which must be moved from time to time and which must be positioned as nearly level as possible at each site where it is located. The present multi-axis level embodiments greatly facilitate the leveling of such structures by assuring that the level remains with the structure at all times, thereby obviating the necessity for the user to locate a portable level and position and reposition the level in various orientations across or-along a surface to be leveled while adjusting the level of the structure.

Figure 1:
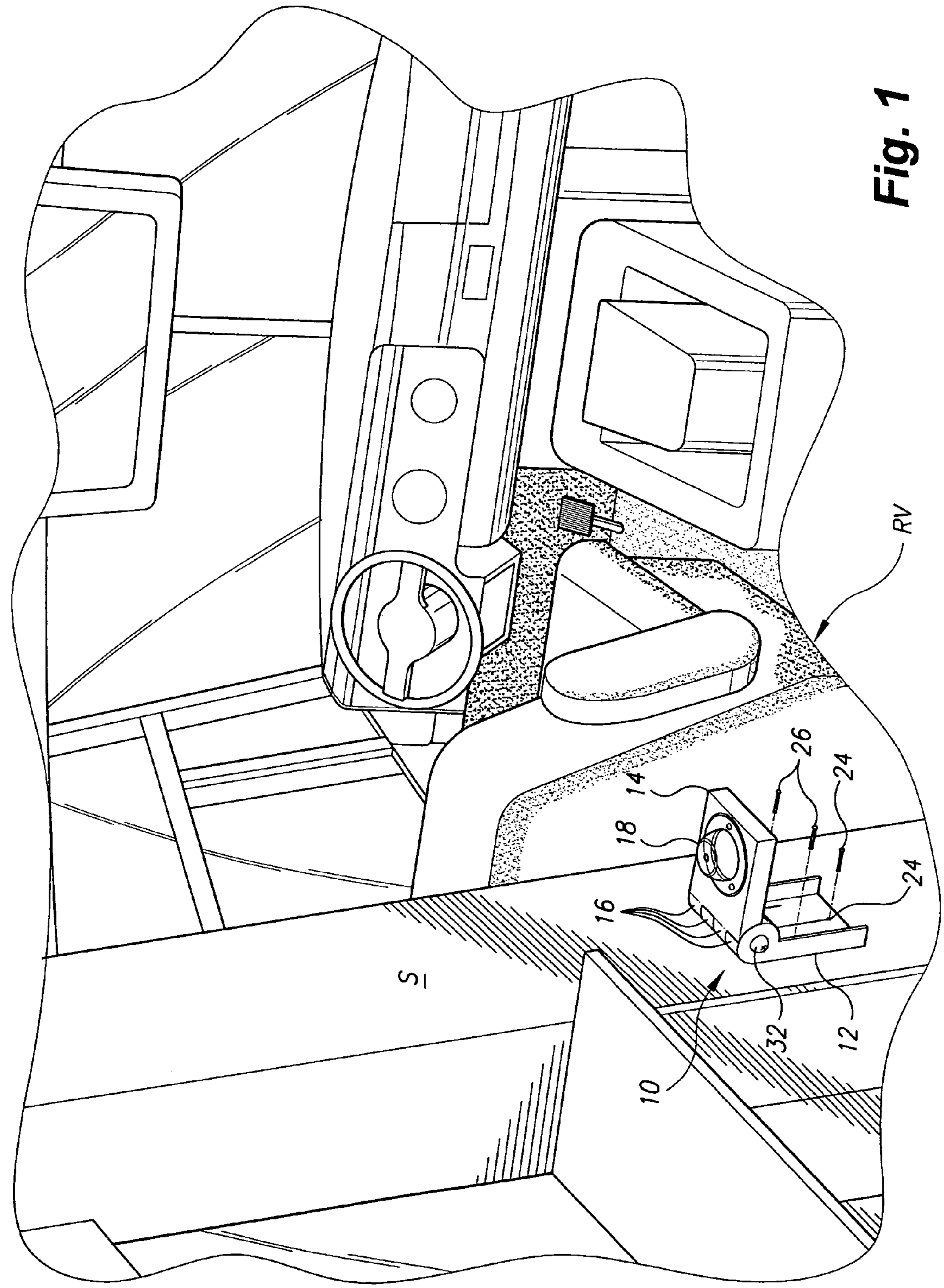
FIG. 1 is an environmental, perspective view of the present multi-axis installable and adjustable level, showing its installation in a recreational vehicle.

FIG. 1 provides an environmental illustration of the present multi-axis level 10, showing its attachment to the interior structure S of a recreational vehicle RV. The installation illustrated in FIG. 1 will be understood to be exemplary, with the present multi-axis level 10 capable of being installed to virtually any surface of any structure which requires leveling from time to time. In the case of recreational vehicles and the like, it is important that the vehicle be leveled when it is parked and used as living quarters for some period of time, in order to provide a level floor, table(s), counter surface(s), etc. for the occupants. The present multi-axis level 10 may be attached to any convenient structure, regardless of its orientation, and adjusted to provide a level indication.

Figure 2:
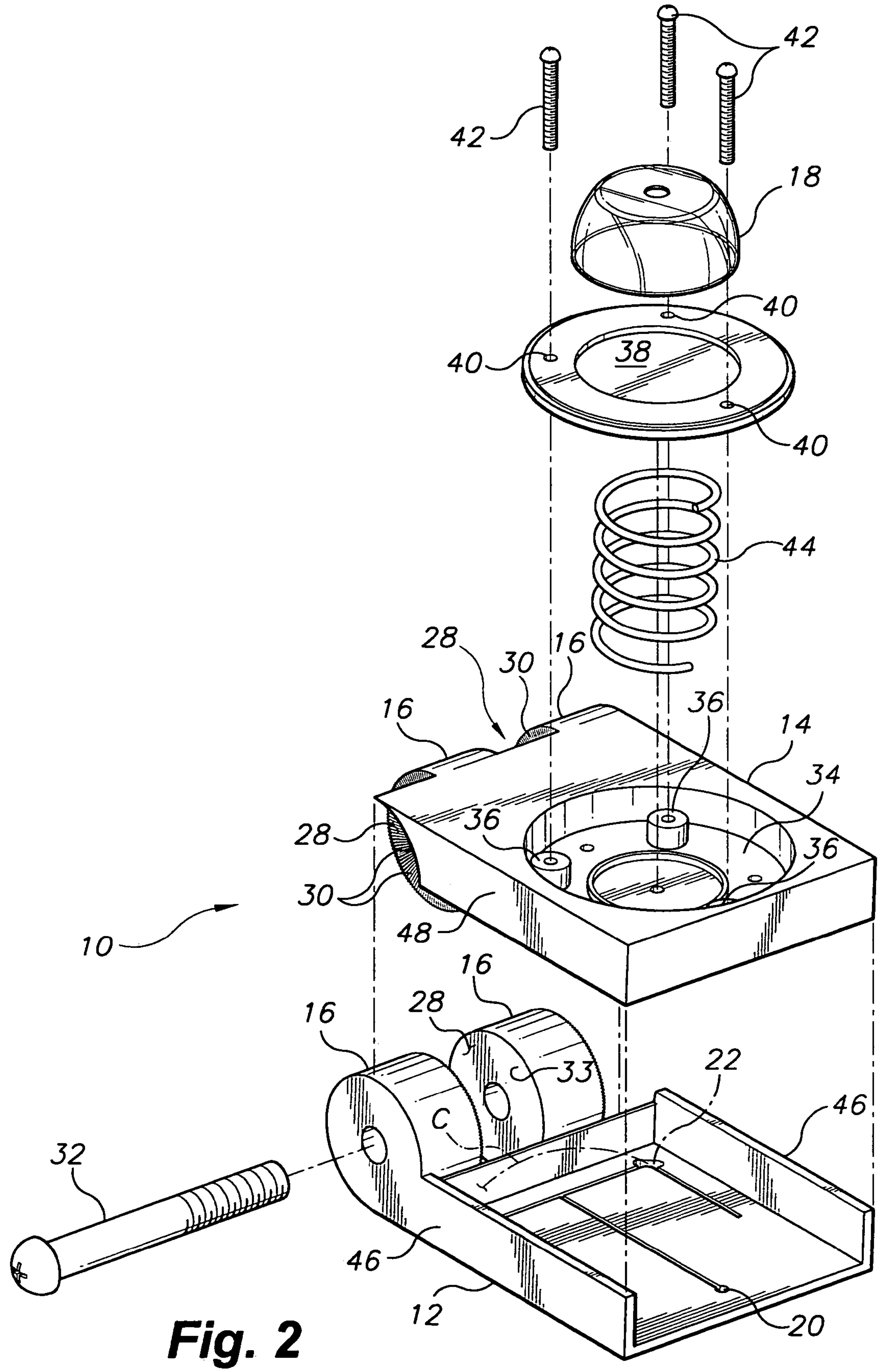
FIG. 2 is an exploded perspective view of the present level device, showing its various components.

FIG. 2 provides an exploded perspective view of the present multi-axis level 10, showing its various components. The level 10 is essentially formed of a permanent attachment leaf 12 and a level display leaf 14 adjustably attached to one another by a hinge formed of a series of interlocking coarse adjustment hinge lugs 16, which permit adjustment of the relative angle between the leaves 12 and 14. An omnidirectional level display 18 is installed atop the level display leaf 14, for viewing by a person using the present level 10. The level display 18 is preferably a "bull's eye" type level, i.e., a circular bubble level providing a simultaneous level indication in any horizontal direction, as opposed to a linear level which provides an indication of level only in the direction in which it is oriented.

The permanent attachment leaf 12 includes a series of attachment holes therethrough, as shown in FIGS. 2 through 5. A single circular fastener hole 20 may be provided through the lower center of the attachment leaf 12, with this hole 20 setting the location of the level 10 during installation. Two additional slotted coarse adjustment holes 22 are provided near the corners opposite the single circular hole 20, with the slotted holes 22 being positioned along an arc C of a fastener circle having its center defined by the circular hole 20. This arrangement permits the device 10 to be positioned generally when the first fastener 24 (shown in FIG. 1) is driven through the circular hole 20, with coarse angular adjustment of the attachment leaf 12 provided by the arcuate holes 22 about their fasteners 26 (also shown in FIG. 1.

The above described attachment hole pattern permits some limited, coarse adjustment of the attachment plate 12 during installation, to adjust for any slight initial error in the positioning of the fastener attachment holes in the structure S. It will be seen that this does nothing to adjust the level of the level display leaf 14 in a plane orthogonal to the plane of the permanent attachment plate 12, however. Accordingly, the present multi-axis level 10 provides additional means for at least coarsely adjusting the level of the display leaf 14. The mating faces 28 of the hinge lugs 16 which extend from the attachment edges of each of the leaves 12 and 14 each include a series of radially disposed position locking teeth 30 which engage the teeth of the opposite mating face 28 of each lug 16 when the lugs 16 are compressed together.

Figure 3:
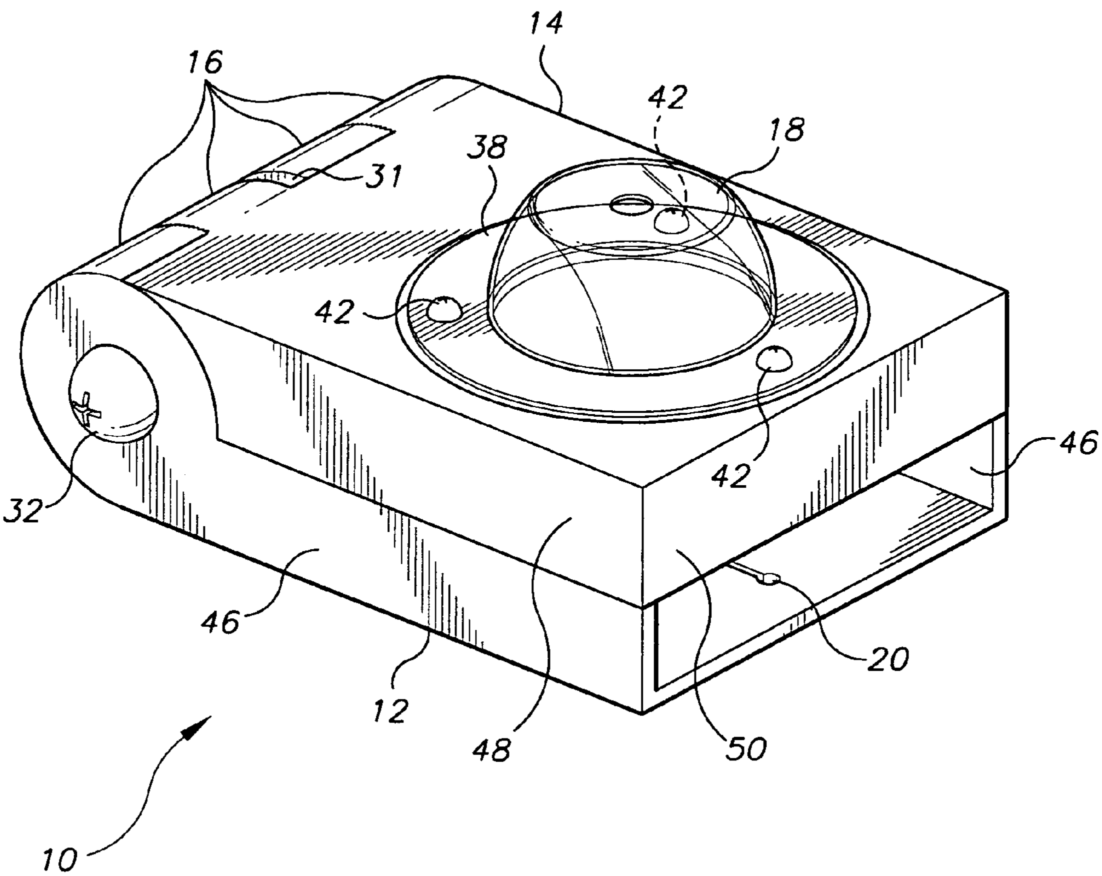
FIG. 3 is a perspective view of the present level, showing its configuration for installing upon a generally level surface.
Figure 4:
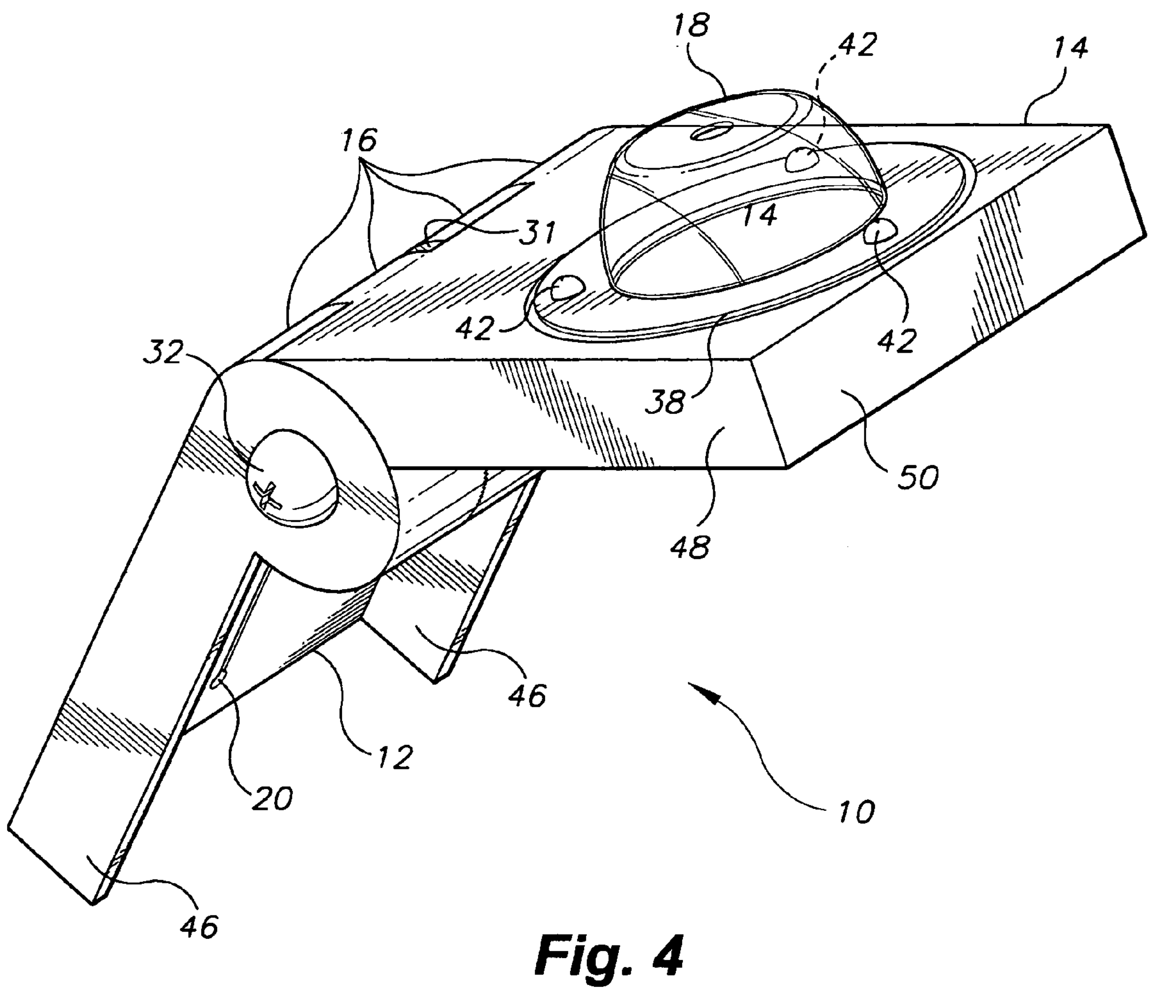
FIG. 4 is a perspective view of the present level in a configuration for installing upon an undercut sloped surface.
Figure 5:
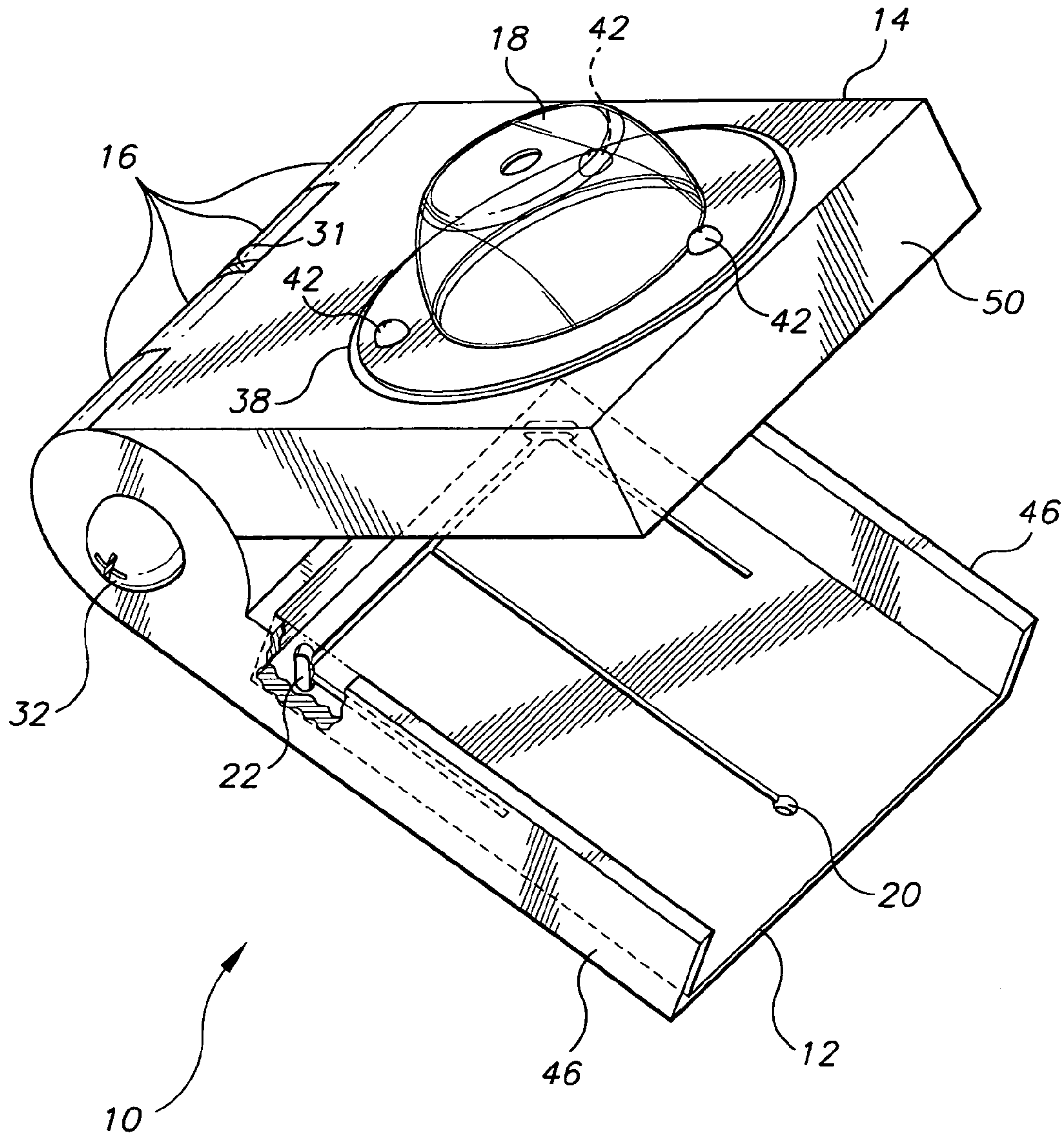
FIG. 5 is a perspective view of the present level in a configuration for installing upon a surface sloped oppositely to that shown in FIG. 4.

Preferably, the leaves 12 and 14 are formed of a rigid, inflexible material, such as a hard, durable plastic or metal material. A gap 31 is provided between the two center lugs 16, with the faces 33 (one of which is shown in FIG. 2) of these two center lugs being smooth. When the locking hinge bolt 32 is loose, the lugs 16 of the attachment leaf 12 and level display leaf 14 may slide axially toward one another along the bolt 32, due to the central gap 31 between the two center lugs 16. This results in clearances being developed between the toothed faces 28 of the first and second lug pair and third and fourth lug pair, allowing the lugs 16 to be rotated relative to one another to adjust the relative alignment of the two leaves 12 and 14. When the bolt 32 is tightened, the toothed faces 28 are forced together and the gap 31 is opened, as shown in FIGS. 3 through 5, to lock the two leaves 12 and 14 together. The bolt 32 may be tightened by engaging a conventional compatibly threaded nut (not shown), either separate from the opposite hinge lug 16 or molded or imbedded therein.

The above described coarse adjustment means, i.e., the arcuate fastener slots 22 and mutually engaging hinge lug teeth 30, permit the plane of the level display leaf 14 to be adjusted to a reasonably close position along axes perpendicular and parallel to the hinge line of the leaves 12 and 14. However, the arcuate adjustment of the attachment leaf 12 by means of the fastener slots 22, and the finite number of teeth 30 of the hinge lugs 16, permit only an approximate adjustment for the level of the level display leaf 14 with its level display device 18.

Accordingly, the present multi-axis level device 10 provides an infinitesimally fine omnidirectional adjustment mechanism of the level display 18, relative to its level display leaf 14 to which it is attached. This mechanism is disposed between the level display leaf 14 and its level display 18, with the components shown in detail in FIG. 2. A seat 34 is formed in the level display leaf 14, with the seat 34 having a series (preferably three evenly spaced) of threaded level display adjustment screw receptacles or bosses 36 therein. An omnidirectional level display mounting plate 38 supports the bubble level display 18, with the level 18 being adhesively or otherwise secured to the mounting plate 38. Alternatively, the plate 38 may be formed as an integral, peripherally extending flange of the level 18. The mounting plate 38 has a periphery with a corresponding series of level adjustment screw holes 40 formed therethrough, with a corresponding series of omnidirectional level display adjustment screws 42 installed through the holes 40 of the level mounting plate 38 and the threaded holes 36 of the level display plate 14.

The above arrangement would allow the level mounting plate 38 to drop downwardly to rest directly within the seat 34 of the level display leaf 14, regardless of the positions of the screws or fasteners 42. Accordingly, a compression spring 44 is positioned concentrically between the level display mounting plate 38 and the underlying seat 34, to hold the position of the level display 18 as desired. The compression spring 44 provides a constant force urging the level display mounting plate 38 away from the underlying seat 34, against the heads of the level adjusting screws or fasteners 42. Thus, any portion of the periphery of the mounting plate 38 may be incrementally adjusted upwardly or downwardly by adjusting one or more of the adjusting screws or fasteners 42 inwardly or outwardly, as desired.

FIGS. 3 through 5 provide illustrations of exemplary installation orientations for the present multi-axis level 10. The present multi-axis installable and adjustable level 10 may be secured to a surface having virtually any angle from horizontal to vertical, inclusive. The exemplary installation of FIG. 1 shows the device 10 installed upon an essentially vertical structure S. This is accomplished by securing the permanent attachment leaf 12 to the vertical structure S, loosening the hinge bolt 32 (if not previously accomplished), adjusting the level display leaf 14 to a substantially horizontal orientation, i.e., on the order of 90° to the attachment leaf 12 (precision is not necessary at this point), and tightening the hinge bolt 32 to lock the mating teeth 30 of the mating hinge lug faces 28 together to prevent relative motion between the leaves.

The present multi-axis adjustable level 10 may also be secured to a substantially horizontal surface, if so desired. FIG. 3 illustrates such a configuration for the device 10, in which the two leaves 12 and 14 are folded together as closely as possible. The attachment leaf 12 includes a pair of mutually opposed edges 46 extending from the periphery thereof, normal to the plane of the leaf 12. The level display leaf 14 includes a pair of corresponding peripheral edges 48, and may include an additional peripheral edge 50 forming a depending wall around all sides of the level display leaf 14, excepting its hinge edge or side. The opposed edges 46 of the attachment leaf 12 and the corresponding edges 48 of the level display leaf 14 are coplanar with one another, and are in contact with one another when the two leaves 12 and 14 are folded as closely together as possible. This places the level display leaf 14 parallel to the attachment leaf 12.

Thus, if it is desired to attach the attachment leaf 12 to a generally horizontal surface, the user need only fold the level display leaf 14 against the attachment leaf 12 until their respective opposed edges 46 and 48 are in contact with one another, to assure that the level display leaf 14 is also positioned generally horizontally, parallel to the attachment leaf 12. The hinge bolt 32 may then be tightened to bring the mating hinge lugs 16 into tight contact with one another, locking the relative position of the two leaves 12 and 14 together by means of the locking teeth 30 of the mating faces 28 of the hinge lugs 16.

FIG. 4 illustrates an installation configuration for the present multi-axis installable and adjustable level 10, in which it is desired to secure the attachment leaf 12 to a sloped surface in which the surface slopes upwardly and toward the level display 18 of the level display leaf 14. In this installation, the two leaves 12 and 14 are opened to provide access to the screw or fastener holes 20 and 22 of the attachment leaf 12, the attachment leaf 12 is secured in place as desired, the level display leaf 14 is adjusted to a position reasonably close to level, and the hinge bolt 32 is tightened to lock the two leaves 12 and 14 immovably together, as described further above.

FIG. 5 illustrates yet another installation configuration for the present multi-axis level 10, in which the attachment structure is sloped upwardly and away from the level display device 18 of the level display leaf 14. In this example, the two leaves 12 and 14 are opened as required to provide clearance for driving the fasteners 24 and 26 (shown in FIG. 1) through their respective holes 20 and 22 in the attachment leaf 12. The level display leaf 14 is then folded to a substantially horizontal position (again, precision is not required at this point) and the hinge bolt 32 tightened to lock the two leaves 12 and 14 immovably relative to one another.

The above described installations use only the coarse adjustment features of the present multi-axis level 10, i.e. the slotted fastener holes 22 of the attachment leaf 12 and the mutually engaging teeth 30 of the facing hinge lugs 16, to position the level display leaf 14 in an approximately level orientation relative to two mutually orthogonal axes. This is not sufficiently accurate for many applications. Accordingly, the infinitesimal and omnidirectional adjustment of the level display device 18 by means of the componentry 34 through 44 illustrated in FIG. 2, enables the level display 18 to be adjusted to an extremely precise degree relative to the structure to which the device 10 is attached.

The actual installation and leveling process first requires that the portable or movable object to which the present leveling device 10 is to be secured, be accurately leveled. This may be accomplished conventionally, e.g. using a conventional linear spirit level or other level indicator resting upon a surface desired to be in a level orientation when the object or structure is at rest, e.g. floor, table top, counter area, etc. in a recreational vehicle. Alternatively, if a surface intended to be level is available, the present leveling device 10 may be temporarily placed in its folded configuration (as shown in FIG. 3) on the surface to be leveled, and the device 10 may be used to check the progress of the leveling operation. The vehicle (or other object) is then leveled conventionally, using jacks and/or other means to level the structure as accurately as possible, while referring back to the leveling device from time to time.

Once the structure has been leveled to the satisfaction of the user, the level indicator 10 may be installed, generally as described above. A suitable place is located, preferably in an unobtrusive position where the level indicator 10 may remain deployed without interference with other objects or persons, and the device 10 is permanently secured to the structure as described further above. This results in the level device 10 providing an indication which is reasonably close to level. However, the finite number of locking teeth 30 between the hinge lugs 16, and the difficulty in making the miniscule arcuate adjustments of the slotted coarse adjustment holes 22 of the attachment leaf 12, will nearly always result in the level display leaf 14 being slightly off from precise level relative to the remainder of the structure to which the leveling device 10 is secured. Other factors may also result in some slight deviation from level for the level display 18, such as any slight flexure of the plastic components as the hinge bolt 32 is tightened.

However, the above is of no consequence, as the infinitesimal and omnidirectional adjustment of the level orientation of the level display 18 serves to compensate for any slight misalignment from true level for the rest of the device 10. Once the device 10 has been permanently attached to the structure at some location as desired, the user of the device 10 need only adjust the level display adjustment screws or fasteners 42 through the level display mounting plate 38 to precisely and accurately level the level display 18 relative to the previously leveled structure or object to which the present adjustable level 10 has been attached. As the structure was previously leveled before the installation of the present device 10, and the level display is leveled, it will be seen that the present level device 10 will thereafter always indicate a true level whenever the structure to which it is attached is precisely level.

Figure 6:
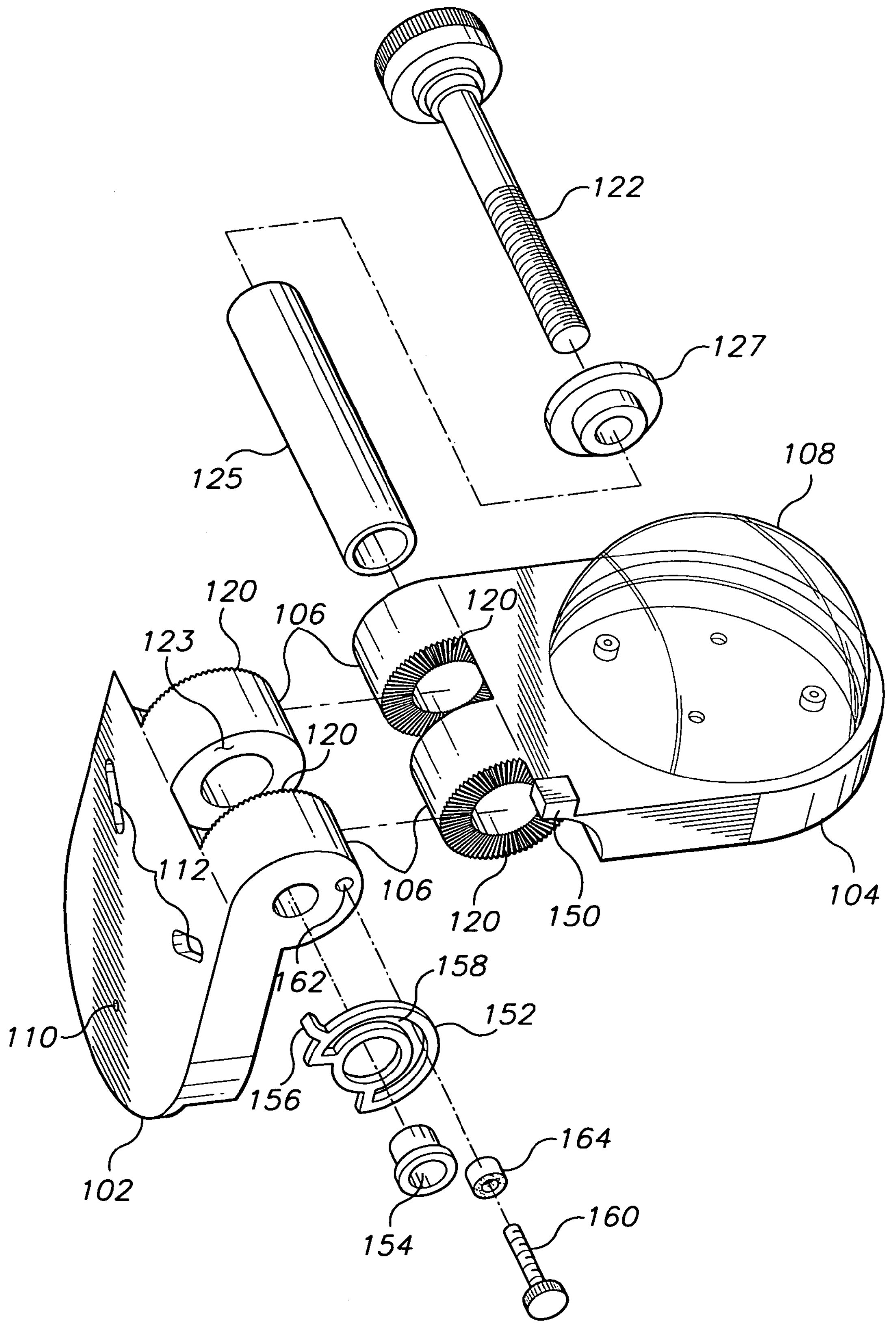
FIG. 6 is an exploded perspective view of an alternate embodiment of the present adjustable level, disclosing an adjustable mechanical stop for consistently opening the level.
Figure 7:
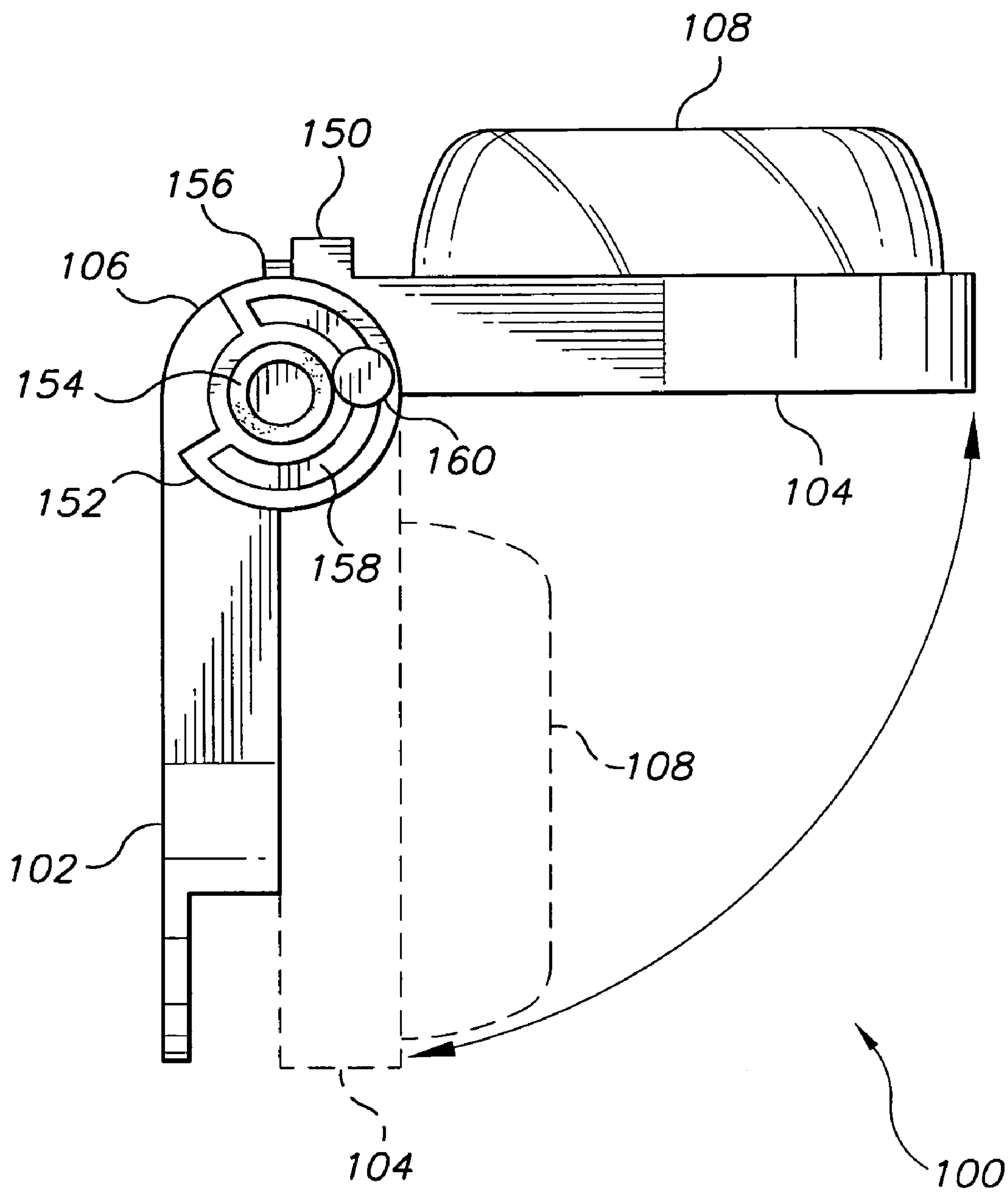
FIG. 7 is a side elevation view of the adjustable level embodiment of FIG. 6, showing its operation.

FIGS. 6 through 9 provide illustrations of a pair of alternate embodiments of the present adjustable level, having means for precisely repositioning the level display leaf after it has been refolded. FIGS. 6 and 7 provide illustrations of a multi-axis installable and adjustable level 100 having a mechanical stop to limit the opening of the level display leaf as desired. The level 100 includes a permanent attachment leaf 102 having a level display leaf 104 hingedly secured thereto. Each leaf 102 and 104 includes a series of hinge lugs 106 extending therefrom. A spherical, "bull's eye" type level 108 is affixed to the level display leaf 104, using the same adjustable attachment means shown in FIG. 2 for securing the level 18 to the level display leaf 14 of the level embodiment 10 of FIGS. 1 through 5. The permanent attachment leaf 102 includes a single circular attachment hole 110 and a pair of arcuate attachment holes 112 for angular adjustment, functioning in the same manner as that described further above for the attachment holes 20 and 22 of the level 10 embodiment.

The hinge lugs 106 engage in the same manner as that described further above for the level embodiment 10 of FIGS. 1 through 5, i.e. by means of their mutually facing radially disposed locking teeth 120. Some axial play is permitted along the hinge bolt 122 to allow the locking teeth 120 to disengage from one another for angular,adjustment of the level display leaf 104 relative to the permanent attachment leaf 102, just as in the first embodiment level 10 of FIGS. 1 through 5. The mating smooth faces 123 of the center lugs permit smooth rotation of the two components 102 and 104 relative to one another when the hinge assembly is loosened. Tightening the bolt 122 urges the locking teeth 120 of the hinge lugs 106 together, thereby engaging the teeth 120 of adjacent lugs 106 with one another to lock the relative angular positions of the two leaves 102 and 104. A sleeve 125 and bushing 127 may be installed within the hinge lugs 106 for smoother operation, if so desired.

The adjustable level 100 of FIGS. 6 and 7 differs from the level embodiment 10 of FIGS. 1 through 5, in that it includes a mechanical stop to limit the angular deployment of the level display leaf 104 relative to the permanent attachment leaf 102. This permits the level display leaf 104 to be folded against the attachment leaf 102 for storage when leveling of the structure is not required, yet allows the level display leaf 104 to be accurately repositioned without need to perform the initial leveling operation again.

The level display leaf 104 includes a stop block 150 extending therefrom, along one edge and adjacent the hinge assembly thereof. A rotationally adjustable mechanical stop ring 152 is installed concentrically with the hinge bolt 122 by means of a bushing 154, with the stop ring 152 having a stop block engaging tab 156 extending therefrom. A semicircular slot 158 is formed in the stop ring 152, with a stop ring lock screw 160 passing through the stop ring slot 158 and engaging a mating hole 162 in the outer face of one hinge lug 106 of the permanent attachment leaf 102. A lock screw bushing 164 may be provided to space the head of the lock screw 160 from the stop ring 152, for ease of manipulation.

FIG. 7 provides a side elevation view of the operation of the adjustable level 100. The adjustable level 100 of FIGS. 6 and 7 is installed upon or in a structure in the manner described further above for the level 10 of FIGS. 1 through 5, i.e. leveling the structure, securing the device 100 in an approximately level orientation, and then fine tuning the adjustment of the level vial 108 relative to its level display leaf 104. At this point, the stop ring 152 is rotated to abut the stop tab 156 against the stop block 150, and the stop ring lock screw 160 is secured tightly to immovably affix the stop ring 152 relative to the outer hinge lug of the permanent attachment leaf 102. The hinge bolt 122 may then be loosened and the level display leaf 104 folded against the permanent attachment leaf 102 for compact storage.

When leveling of the apparatus is again required, all that is necessary is to fold the level display leaf 104 upwardly and outwardly until the stop block 150 of the level display leaf 104 contacts the previously adjusted stop ring tab 156 of the stop ring 152, thereby preventing further angular extension of the level display leaf 104. As the level display leaf 104 was perfectly level at the time the stop ring 152 was previously adjusted, the level display leaf 104 will once again be set to indicate the level of the apparatus to which it is attached when the stop block 150 of the level display leaf 104 is in contact with the stop ring tab 156 secured to the permanent attachment leaf 102.

Figure 8:
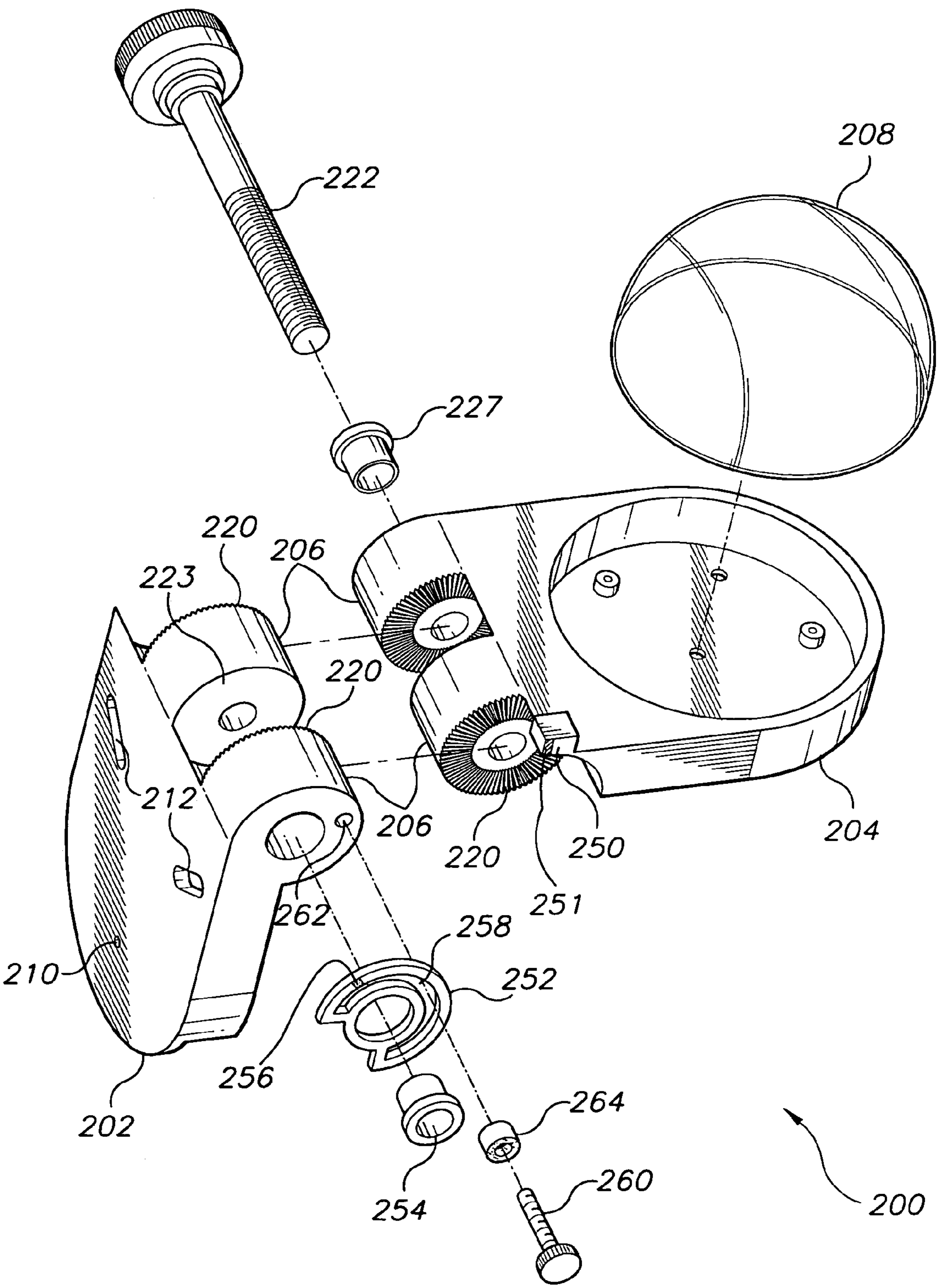
FIG. 8 is an exploded perspective view of an alternate embodiment of the present adjustable level, disclosing adjustable alignment marks for consistently opening the level.
Figure 9:
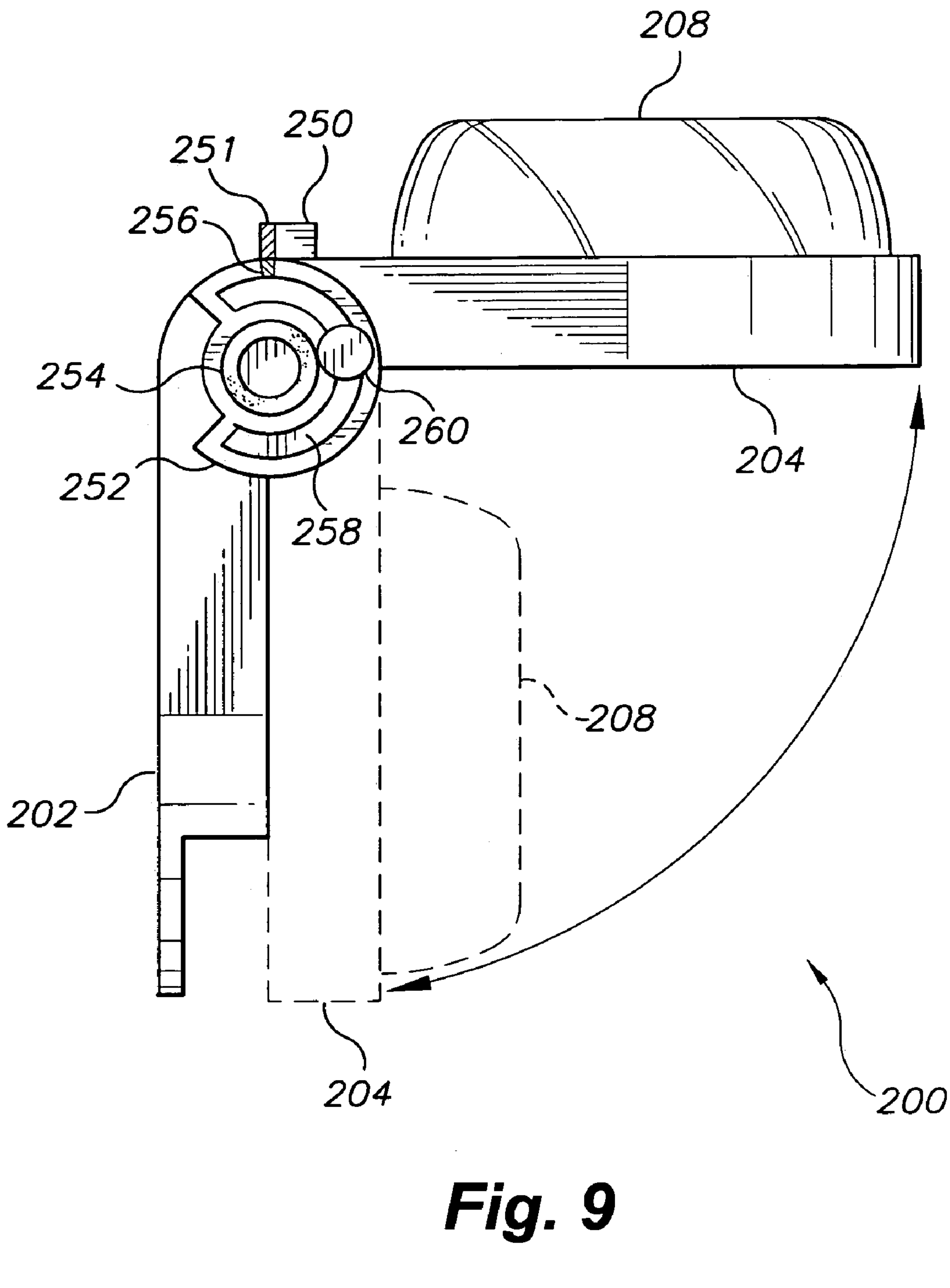
FIG. 9 is a side elevation view of the adjustable level embodiment of FIG. 8, showing its operation.

The adjustable level assembly 200 of FIGS. 8 and 9 is quite similar to the level assembly 100 of FIGS. 6 and 7, but includes a different means of assuring the repeated alignment of the level display leaf to its proper position after folding. The adjustable level 200 of FIGS. 8 and 9 includes the various equivalent components and features of the level 100 of FIGS. 6 and 7, i.e. permanent attachment and level display leaves 202 and 204 with their mating hinge lugs 206, a spherical "bull's eye" level 208 adjustably affixed to the level display leaf 204, and mounting holes 210 and 212 in the attachment leaf 202. The lugs 206 include abutting radially toothed faces 220, which lock together when the hinge bolt 222 is tightened. Axial play in the hinge lugs 206 permit the toothed faces 220 to disengage, with the smooth hinge lug faces 223 allowing relative rotation of the two leaves 202 and 204. As an alternative construction, the hinge bolt passages through the hinge lugs are substantially the same diameter as the hinge bolt 222, allowing the elongate sleeve of the embodiment of FIGS. 6 and 7 to be omitted. A relatively large hinge bolt bushing 227 is provided in lieu of the sleeve. It will be understood that either hinge construction may be used with any of the embodiments of the present invention, as desired.

The level display leaf 204 includes a stop or alignment block 250 extending therefrom, in a position equivalent to the stop block 150 of the embodiment 100 of FIGS. 6 and 7. The alignment block 250 further includes a fixed alignment mark 251 thereon, extending radially from the hinge axis of the assembly. An alignment ring 252 is adjustably installed concentrically with the hinge bolt 222 by means of a bushing 254, with the alignment ring 252 having an adjustable alignment mark 256 thereon. A semicircular slot 258 is formed in the alignment ring 252, with an alignment ring lock screw 260 passing through the alignment ring slot 258 and engaging a mating hole 262 in the outer face of one hinge lug 206 of the permanent attachment leaf 202. A lock screw bushing 264 may be provided to space the head of the lock screw 260 from the stop ring 252, for ease of manipulation.

FIG. 9 provides a side elevation view of the operation of the adjustable level 200. The adjustable level 200 of FIGS. 8 and 9 is installed upon or in a structure in the manner described further above for the level 10 of FIGS. 1 through 5, i.e. leveling the structure, securing the device 200 in an approximately level orientation, and then fine tuning the adjustment of the level vial 208 relative to its level display leaf 204. At this point, the stop ring 252 is rotated to align its adjustable alignment mark 256 with the fixed alignment mark 251 of the alignment block 250 of the level display leaf 204, and the alignment ring lock screw 260 is secured tightly to immovably affix the alignment ring 252 relative to the outer hinge lug of the permanent attachment leaf 202. The hinge bolt 222 may then be loosened and the level display leaf 204 folded against the permanent attachment leaf 202 for compact storage.

When leveling of the apparatus is again required, all that is necessary is to fold the level display leaf 204 upwardly and outwardly until the fixed alignment mark 251 of the alignment block 250 of the level display leaf 204 is aligned with the previously adjusted alignment mark 256 of the alignment ring 252. As the level display leaf 204 was perfectly level at the time the alignment ring 252 was previously adjusted, the level display leaf 204 will once again be set to indicate the level of the apparatus to which it is attached when the alignment mark 251 of the alignment block 250 of the level display leaf 204 is in precise alignment with the alignment ring mark 256 of the alignment ring 252 secured to the permanent attachment leaf 102.

In conclusion, the present multi-axis installable and adjustable level in its various embodiments provides a much needed means of quickly and accurately establishing a level attitude for virtually any movable structure which must be leveled for use in its stationary state. The present leveling device is relatively inexpensive to manufacture, and may be readily purchased by virtually anyone who has need of such a device. The present leveling device may be used to verify the leveling of an object or structure where any suitable conventional physical leveling means is used to actually adjust the level of the structure. However, the present leveling device is particularly well suited for use with automated leveling devices, where the user may remotely adjust the level of the structure or vehicle by means of an electrohydraulic or other powered system, merely by observing the indication provided by the present leveling device and adjusting the controls accordingly. Regardless of the physical leveling means used, the present leveling device will save considerable time and prove considerably more convenient than earlier devices and leveling methods of the related art.

It is to be understood that the present invention is not limited to the embodiments described above, but encompasses any and all embodiments within the scope of the following claims.

I claim:

1. A multi-axis installable and adjustable level, comprising:

a permanent attachment leaf having a plurality of attachment holes therethrough;

a level display leaf;

an omnidirectional level display disposed upon said level display leaf;

an infinitesimally and omnidirectionally adjustable level display mechanism disposed between said level display leaf and said omnidirectional level display, wherein said infinitesimally and omnidirectionally adjustable level display mechanism comprises:

an omnidirectional level display mounting plate having a periphery with a plurality of level adjustment screw holes;

said level display leaf having a level display mounting plate seat with a plurality of threaded level display adjustment screw receptacles disposed therein, corresponding in number to said level display adjustment screw holes of said omnidirectional level display mounting plate;

a plurality of omnidirectional level display adjustment screws disposed through said level display adjustment screw holes of said omnidirectional level display mounting plate and said threaded level display adjustment screw receptacles of said level display leaf; and a level display position-holding compression spring disposed between said level display leaf and said omnidirectional level display mounting plate;

a plurality of coarse adjustment hinge lugs adjustably interconnecting said permanent attachment leaf to said level display leaf, said plurality of coarse adjustment hinge lugs of each said leaf includes a plurality of mutually mating faces and a plurality of radially disposed hinge lug position locking teeth disposed on each of said mating faces; and a hinge bolt passing through said coarse adjustment hinge lugs;

wherein said plurality of radially disposed hinge lug position locking teeth selectively lock said leaves immovably together when said hinge bolt is tightened.

2. The multi-axis installable and adjustable level according to claim 1, wherein said omnidirectional level display is a bull's eye level.

3. The multi-axis installable and adjustable level according to claim 1, wherein at least said permanent attachment leaf and said level display leaf are formed of materials selected from the group consisting of metal and plastic.

4. The multi-axis installable and adjustable level according to claim 1, wherein said attachment holes of said permanent attachment leaf comprise:

a single round fastener hole; and two coarse adjustment mounting holes disposed upon a fastener circle defined by said single round fastener hole, with said coarse adjustment mounting holes comprising arcuate slots disposed upon said fastener circle and aligned therewith.

5. The multi-axis installable and adjustable level according to claim 1, further including:

a pair of mutually opposed edges extending from said permanent attachment leaf, and normal thereto; and a plurality of peripheral edges depending from said level display leaf, with one of said peripheral edges of said level display leaf contacting a respective one of said mutually opposed edges of said permanent attachment leaf when said permanent attachment leaf and said level display leaf are folded together, thereby placing each said leaf parallel to one another.

6. The multi-axis installable and adjustable level according to claim 1, further including:

a stop block extending from said level display leaf; and an adjustable mechanical stop adjustably abutting said stop block and stopping further angular extension of said level display leaf when said mechanical stop is properly adjusted and said level display leaf is leveled.

7. The multi-axis installable and adjustable level according to claim 1, further including:

a fixed alignment mark disposed upon said level display leaf; and an adjustable alignment mark adjustably aligned with said fixed alignment mark and indicating proper angular extension of said level display leaf when said adjustable alignment mark is properly adjusted and said level display leaf is leveled.

8. A multi-axis installable and adjustable level, comprising:

a permanent attachment leaf having a plurality of attachment holes therethrough;

a level display leaf extending from said permanent attachment leaf;

an omnidirectional level display disposed upon said level display leaf; and an infinitesimally and omnidirectionally adjustable level display mechanism disposed between said level display leaf and said omnidirectional level display, wherein said infinitesimally and omnidirectionally adjustable level display mechanism further comprises:

an omnidirectional level display mounting plate having a periphery with a plurality of level adjustment screw holes;

said level display leaf having a level display mounting plate seat with a plurality of threaded level display adjustment screw receptacles disposed therein, corresponding in number to said level display adjustment screw holes of said omnidirectional level display mounting plate;

a plurality of omnidirectional level display adjustment screws disposed through said level display adjustment screw holes of said omnidirectional level display mounting plate and said threaded level display adjustment screw receptacles of said level display leaf; and a level display position-holding compression spring disposed between said level display leaf and said omnidirectional level display mounting plate.

9. The multi-axis installable and adjustable level according to claim 8, further including a plurality of coarse adjustment hinge lugs adjustably interconnecting each said leaf together; and a hinge bolt passing through said hinge lugs and selectively locking each said immovably together.

10. The multi-axis installable and adjustable level according to claim 9, wherein said plurality of coarse adjustment hinge lugs of each said leaf further includes:

a plurality of mutually mating faces; and a plurality of radially disposed hinge lug position locking teeth disposed upon each of said mating faces, locking said coarse adjustment hinge lugs immovably together when said hinge bolt is tightened.

11. The multi-axis installable and adjustable level according to claim 8, wherein said omnidirectional level display is a bull's eye level.

12. The multi-axis installable and adjustable level according to claim 8, wherein at least said permanent attachment leaf and said level display leaf are formed of materials selected from the group consisting of metal and plastic.

13. The multi-axis installable and adjustable level according to claim 8, wherein said attachment holes of said permanent attachment leaf comprise:

a single round fastener hole; and two coarse adjustment mounting holes disposed upon a fastener circle defined by said single round fastener hole, with said coarse adjustment mounting holes comprising arcuate slots disposed upon said fastener circle and aligned therewith.

14. The multi-axis installable and adjustable level according to claim 8, further including:

a pair of mutually opposed edges extending from said permanent attachment leaf, and normal thereto; and a plurality of peripheral edges depending from said level display leaf, with one of said peripheral edges of said level display leaf contacting a respective one of said mutually opposed edges of said permanent attachment leaf when said permanent attachment leaf and said level display leaf are folded together, thereby placing each said leaf parallel to one another.

15. The multi-axis installable and adjustable level according to claim 8, further including:

a stop block extending from said level display leaf; and an adjustable mechanical stop adjustably abutting said stop block and stopping further angular extension of said level display leaf when said mechanical stop is properly adjusted and said level display leaf is leveled.

16. The multi-axis installable and adjustable level according to claim 8, further including:

a fixed alignment mark disposed upon said level display leaf; and an adjustable alignment mark adjustably aligned with said fixed alignment mark and indicating proper angular extension of said level display leaf when said adjustable alignment mark is properly adjusted and said level display leaf is leveled.

* * * * *